US010827882B2

(12) United States Patent
Verhelle

(10) Patent No.: US 10,827,882 B2
(45) Date of Patent: Nov. 10, 2020

(54) FOOD PRODUCT GRASPING APPARATUS

(71) Applicant: Matthew L. Verhelle, Fenton, MI (US)

(72) Inventor: Matthew L. Verhelle, Fenton, MI (US)

(*) Notice: Subject to any disclaimer, the term of this patent is extended or adjusted under 35 U.S.C. 154(b) by 209 days.

(21) Appl. No.: 16/176,492

(22) Filed: Oct. 31, 2018

(65) Prior Publication Data
US 2019/0133379 A1 May 9, 2019

Related U.S. Application Data

(60) Provisional application No. 62/583,010, filed on Nov. 8, 2017.

(51) Int. Cl.
A47J 43/28 (2006.01)
A23G 3/24 (2006.01)
A23P 20/15 (2016.01)
A47J 43/18 (2006.01)

(52) U.S. Cl.
CPC ............. A47J 43/283 (2013.01); A23G 3/24 (2013.01); A23P 20/15 (2016.08); A47J 43/18 (2013.01)

(58) Field of Classification Search
CPC .... B25J 11/0045; B25J 15/0226; B25J 15/10; B25J 15/103; A23P 20/15; A23G 3/24; B65B 21/18; B65G 47/90; A47J 43/18; A47J 43/283
USPC ........................................ 294/115, 116, 100
See application file for complete search history.

(56) References Cited

U.S. PATENT DOCUMENTS

| | | | | |
|---|---|---|---|---|
| 925,212 A | * | 6/1909 | McConville | |
| 1,600,649 A | * | 9/1926 | Basini | A23G 3/24 294/100 |
| 1,777,248 A | * | 9/1930 | Bergquist | A47G 21/10 294/115 |
| 1,801,456 A | * | 4/1931 | Pryor | E21B 31/18 294/86.21 |
| 2,350,692 A | * | 6/1944 | Milek | E21B 31/18 294/86.29 |
| 2,493,949 A | * | 1/1950 | Donahue | B25B 13/32 81/345 |
| 2,829,918 A | * | 4/1958 | Stoakes | B65B 21/18 294/99.1 |
| 4,034,542 A | * | 7/1977 | Loehr | A01D 46/247 56/333 |
| 4,348,044 A | * | 9/1982 | Wood, III | B23Q 7/043 294/115 |
| 5,503,446 A | * | 4/1996 | De Jong | B25B 9/00 294/100 |

* cited by examiner

Primary Examiner — Dean J Kramer
(74) Attorney, Agent, or Firm — Charles F. Charpie, III

(57) ABSTRACT

A food product gripping mechanism is provided. The food product gripping mechanism includes a shaft connected to a hub. A release mechanism has a first passage in fluid communication with a second passage. The second passage is configured to allow the shaft to pass therethrough. A tension member is positioned partly within the first passage of the release mechanism. A guide spool is configured to receive a portion of the tension member and further configured to allow the shaft to pass therethrough and a plurality of tongs is connected to the hub. The plurality of tongs are configured for a contracted orientation and further configured for rotation to an expanded orientation. The plurality of tongs are further configured to grip a food product without piercing a skin of the food product.

18 Claims, 7 Drawing Sheets

FOOD PRODUCT GRASPING APPARATUS

CROSS-REFERENCE TO RELATED APPLICATIONS

This application claims the benefit of U.S. Provisional Application No. 62/583,010 filed Nov. 8, 2017, the disclosure of which is incorporated herein by reference in its entirety.

BACKGROUND

Traditionally, caramel-covered, chocolate-covered or candy-covered food products have utilized a handle, often in the form of a stick, inserted into the food product and configured to hold the food product as the food product is dipped in the covering material. Non-limiting examples of food products include apples or strawberries. The process of inserting the stick into the food product can pierce the food product's outer skin, thereby allowing for the increased probability of foodborne illness through bacteria.

It is understood that certain food products can be perishable commodities and the shelf life of the food products can be limited due to the nature of the food products. It is also understood that piercing an outer skin of a food product can begin the process of degradation of the food product, thereby causing a reduction in the shelf life of the food product. When handled correctly, certain unpierced and uncovered food products, stored in a cool and controlled environment, can have shelf lives of up to six months in storage. However, when the outer skins of certain food products are pierced during the covering process, the shelf life can be greatly reduced to only a few weeks.

It would be advantageous to provide an improved mechanism for forming covered food products without piercing the food product.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the food product gripping apparatus.

The above objects as well as other objects not specifically enumerated are achieved by a food product gripping mechanism. The food product gripping mechanism includes a shaft connected to a hub. A release mechanism has a first passage in fluid communication with a second passage. The second passage is configured to allow the shaft to pass therethrough. A tension member is positioned partly within the first passage of the release mechanism. A guide spool is configured to receive a portion of the tension member and further configured to allow the shaft to pass therethrough and a plurality of tongs is connected to the hub. The plurality of tongs are configured for a contracted orientation and further configured for rotation to an expanded orientation. The plurality of tongs are further configured to grip a food product without piercing a skin of the food product.

Various aspects of the food product grasping apparatus will become apparent to those skilled in the art from the following detailed description of the illustrated embodiments, when read in light of the accompanying drawings.

DETAILED DESCRIPTION

The food product gripping apparatus will now be described with occasional reference to the specific embodiments. The food product gripping apparatus may, however, be embodied in different forms and should not be construed as limited to the embodiments set forth herein. Rather, these embodiments are provided so that this disclosure will be thorough and complete, and will fully convey the scope of the food product gripping apparatus to those skilled in the art.

Unless otherwise defined, all technical and scientific terms used herein have the same meaning as commonly understood by one of ordinary skill in the art to which the food product gripping apparatus belongs. The terminology used in the description of the food product gripping apparatus herein is for describing particular embodiments only and is not intended to be limiting of the food product gripping apparatus. As used in the description of the food product gripping apparatus and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the food product gripping apparatus. Notwithstanding that the numerical ranges and parameters setting forth the broad scope of the food product gripping apparatus are approximations, the numerical values set forth in the specific examples are reported as precisely as possible. Any numerical values, however, inherently contain certain errors necessarily resulting from error found in their respective measurements.

Figure 1:
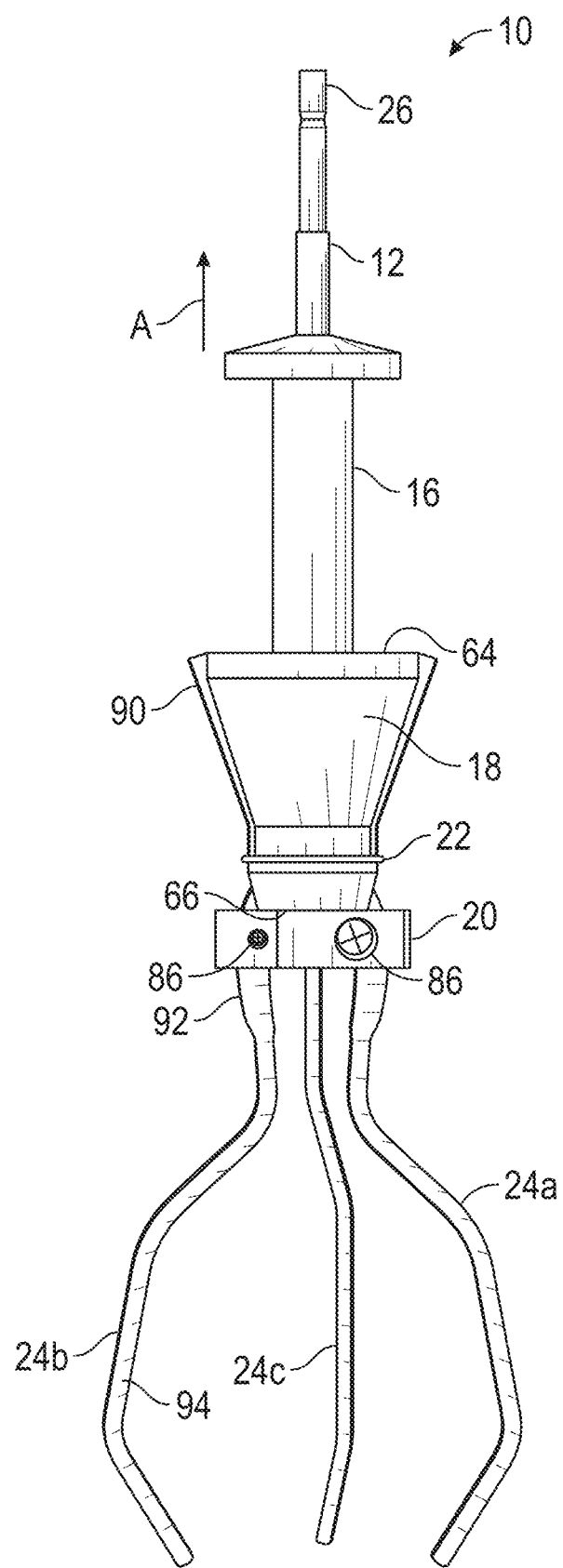
FIG. 1 is a perspective view of a food product gripping mechanism shown in a contracted orientation.
Figure 2:
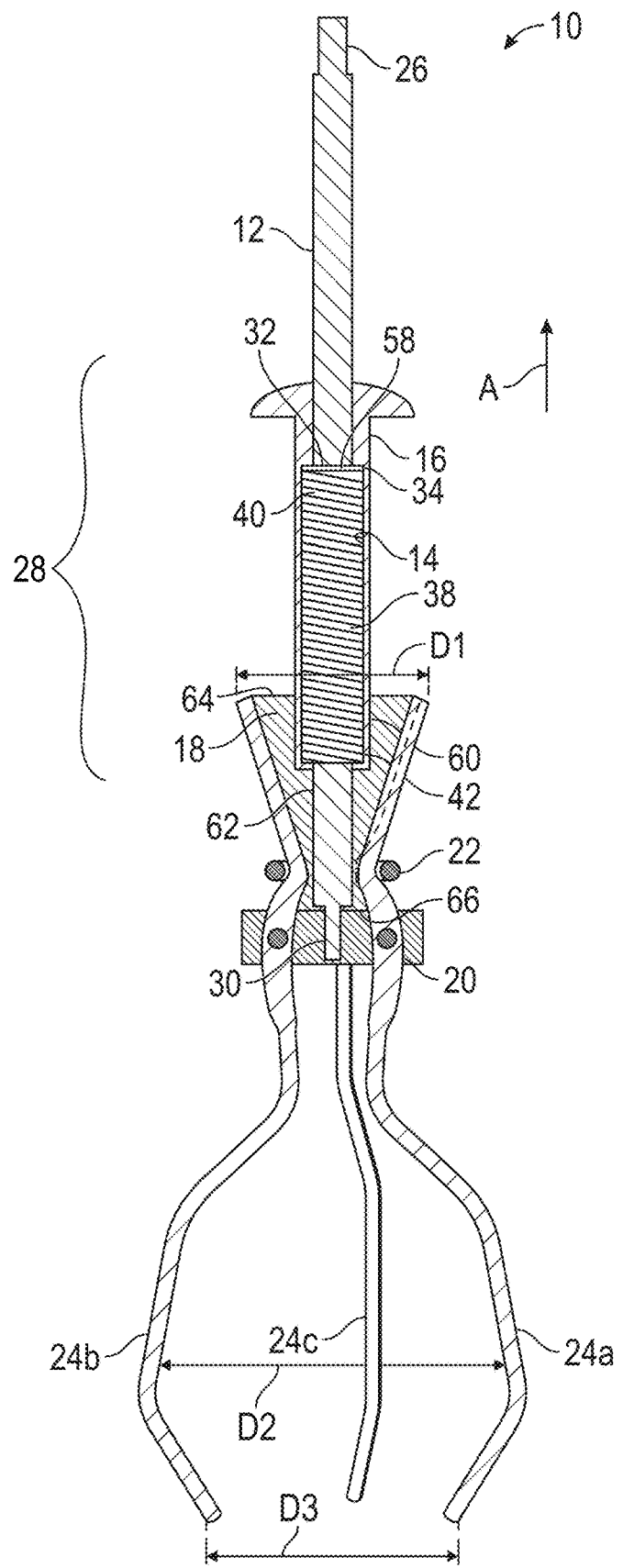
FIG. 2 is a cross-sectional view of the food product gripping mechanism of FIG. 1.

Referring now to FIGS. 1 and 2, one non-limiting embodiment of a food product gripping mechanism (hereafter "mechanism") is shown generally at 10. Generally, the mechanism 10 is a tensioned device equipped with a plurality of tongs configured to grab and secure a food product during a covering process without the need to pierce an outer skin of the food product with a stick or other handle-like structure. Since the outer skin of the food product is not pierced, the decline or degradation of the food product is slower than if the outer skin of the food product is pierced.

Referring now to FIGS. 1 and 2, the mechanism 10 is a tensioned, multi-tong device and includes a shaft 12, a tension member 14, a release structure 16, a guide spool 18, a hub 20, a retention member 22 and a plurality of tongs 24a-24c.

Figure 3:
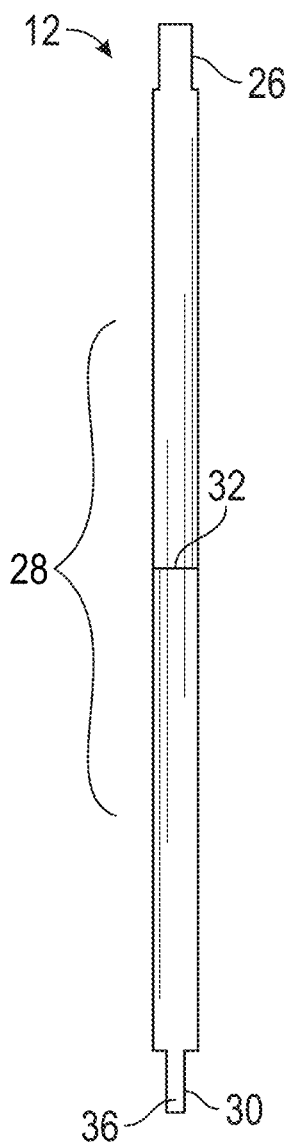
FIG. 3 is a side view of a shaft of the food product gripping mechanism of FIG. 1.

Referring now to FIGS. 1-3, the shaft 12 includes a first end 26, a center section 28 and a second end 30. Optionally, the first end 26 of the shaft can be configured for connection to powered machinery, such as the non-limiting example of a drill or mixer. In certain embodiments, the powered mechanism can be adapted to spin the food product in a manner such as to rid the food product of the excess covering material. In the illustrated embodiment, the first end 26 has the cross-sectional shape of a hex, configured for receipt by a conventional chuck. However, in other embodiments, the first end 26 of the shaft 12 can have other cross-sectional shapes configured for connection to powered mechanisms. However, it should be appreciated that connection of the first end 26 of the shaft to powered mechanisms is optional and not required for successful operation of the mechanism 10.

Referring again to FIGS. 1-3, the center section 28 of the shaft 12 extends from the first end 26 to the second end 30. The center section 28 of the shaft 12 includes an annular groove 32. The annular groove 32 is configured to receive a snap ring 34. The snap ring 34 will be discussed in more detail below.

Referring again to FIGS. 1-3, the second end 30 of the shaft 12 extends from the center section 28 and includes an external threaded portion 36. The external threaded portion 36 is configured for a threaded connection to a portion of the hub 20. In the illustrated embodiment, the external threaded portion 36 has a thread size of ¼"-20. However, the external threaded portion 36 can have any thread size and arrangement sufficient to achieve a threaded connection with a portion of the main body.

Referring now to FIG. 2, the tension member 14 includes an aperture 38 extending therethrough. The aperture 38 is configured to receive the shaft 12 such that in an installed position, shaft 12 extends through the tension member 14 and the center section 28 of the shaft 12 is positioned within the tension member 14. A first end 40 of the tension member 14 seats against the snap ring 34 and a second end 42 of the tension member 14 seats against a portion of the guide spool 18. In operation, the tension member 14 is configured to provide a tension force against the snap ring 34, thereby urging the first end 26 of the shaft 12 in an axial direction away from the guide spool 18. In the embodiment illustrated in FIG. 2, the tension member 14 has the form of a coil tension spring. However, in other embodiments, the tension member 14 can have other forms sufficient to provide a tension force against the snap ring 34 and urge the first end 26 of the shaft 12 in an axial direction away from the guide spool 18.

Figure 4A:
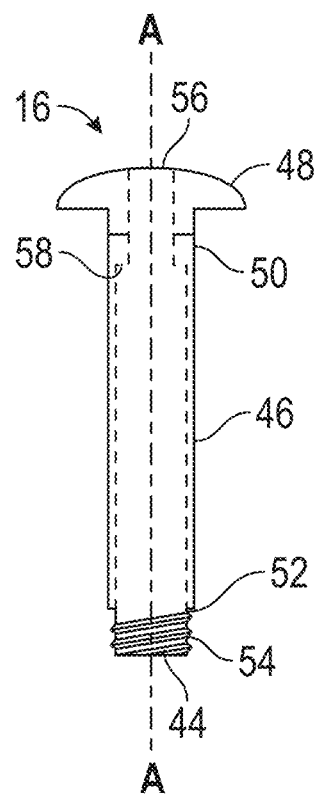
FIG. 4A is a side view of a release mechanism of the food product gripping mechanism of FIG. 1.
Figure 4B:
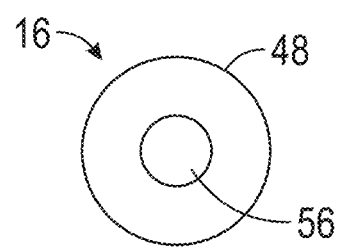
FIG. 4B is a plan view of the release mechanism of FIG. 4A.

Referring now to FIGS. 4A and 4B, the release structure 16 includes a first passage 44 extending within a circumferential wall 46. A head 48 abuts a first end 50 of the release structure 16 and a second end 52 of the release structure 16 includes an external threaded portion 54. The first passage 44 extends from the head 48 through the external threaded portion 54 at the second end 52 of the release structure 16.

Referring against to FIGS. 4A and 4B, a second passage 56 extends through the head 48 of the release structure and is in fluid communication with the first passage 44. The first and second passages 44, 56 are axially aligned along axis A-A. In the illustrated embodiment, the first and second passages 44, 56 have circular cross-sectional shapes such that the first passage 44 can house the tension member 14 and the second passage can slidably receive the center section 28 of the shaft 12. However, it should be appreciated that in other embodiments, the first and second passages 44, 56 can have other cross-sectional shapes, sufficient such that the first passage 44 can house the tension member 14 and the second passage can slidably receive the center section 28 of the shaft 12. The first passage 44 has a larger diameter than the second passage 56.

Referring now to FIGS. 2 and 4A, in an assembled arrangement, the shaft 12 extends through the first and second passages 44, 56 of the release member 16 in a manner such that the snap ring 34 seats against a shoulder 58 formed at the intersection of the first and second passages 44, 56. The external threaded portion 54 of the second end 52 of the release structure forms a threaded connection with a portion of the guide spool 18. Assembled in this manner, the tension member 14 is constrained between the snap ring 34 and the guide spool 18.

Referring now to FIGS. 1, 2, 5A and 5B, the guide spool 18 includes a first bore 60 and a second bore 62. The first bore 60 extends from a first end 64 in a direction toward a second end 66. The first bore 60 is configured with an internal threaded portion 61. The internal threaded portion 61 of the first bore 60 is configured to receive the external threaded portion 54 of the release structure 16 such that the internal threaded portion 61 of the guide spool 18 forms a threaded connection with the internal threaded portion 61 of the guide spool 18.

Referring again to FIGS. 1, 2, 5A and 5B, the second bore 62 extends from the first bore 60 to the second end 66. The first bore 60 is in fluid communication with the second bore 62. The first and second bores 60, 62 are axially aligned along axis B-B. In the illustrated embodiment, the first and second bores 60, 62 have circular cross-sectional shapes such that the first bore 60 can receive a portion of the tension member 14 and the second 62 can slidably receive a portion of the center section 28 of the shaft 12. However, it should be appreciated that in other embodiments, the first and second bores 60, 62 can have other cross-sectional shapes, sufficient such that the first bore 60 can receive a portion of the tension member 14 and the second bore 62 can slidably receive a portion of the center section 28 of the shaft 12. The first bore 60 has a larger diameter than the second bore 62.

Figure 5A:
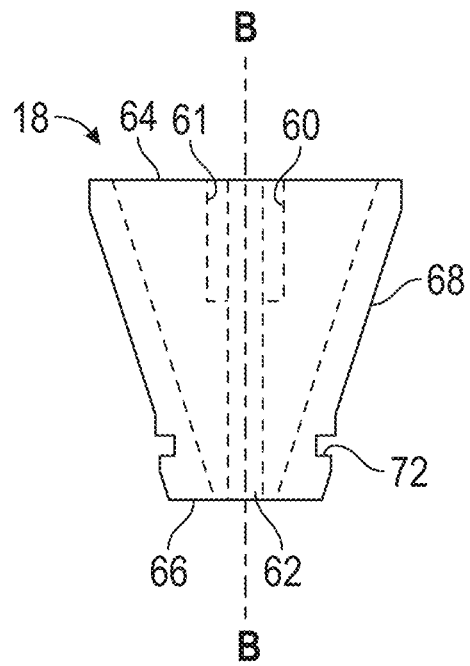
FIG. 5A is a side view of a guide spool of the food product gripping mechanism of FIG. 1.
Figure 5B:
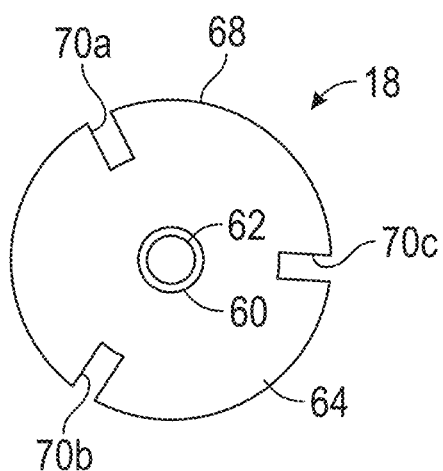
FIG. 5B is a plan view of the guide spool of FIG. 5A.

Referring now to FIGS. 5A and 5B, the guide spool 18 has the form of an inverted conical frustum, with the first end 64 having a larger diameter than the second end 66. The guide spool 18 includes an outer circumferential surface 68 and a plurality of spaced apart channels 70a-70c. The channels 70a-70c are configured to receive portions of the tongs 24a-24c such that the tongs 24a-24c are slidable within the channels 70a-70c. The channels 70a-70c extend from the first end 64 to the second end 66.

Referring again to FIGS. 5A and 5B, an annular groove 72 is positioned adjacent the second end 66. The annular groove 72 is configured to receive the retention member 22. The annular groove 72 and the retention member 22 will be discussed in more detail below.

Referring now to FIGS. 1, 2, 6A and 6B, the hub 20 includes a plurality of spaced apart wings 74a-74c extending radially from a center aperture 76. Each of the wings 74a-74c includes an opening 78a-78c. The openings 78a-78c are configured to receive a portion of the tongs 24a-24c such that the tongs 24a-24c are rotatable within the openings 78a-78c.

Figure 6A:
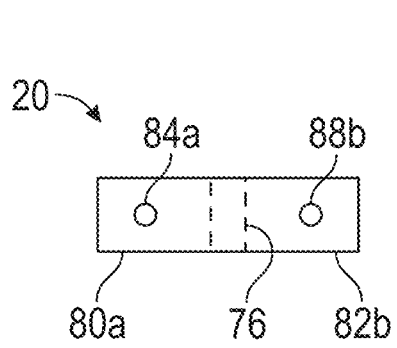
FIG. 6A is a side view of a hub of the food product gripping mechanism of FIG. 1.
Figure 6B:
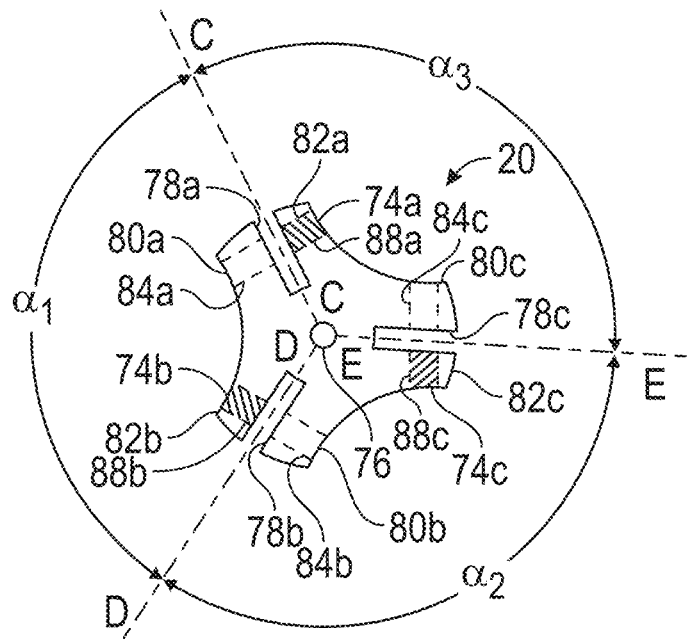
FIG. 6B is a plan view of the hub of FIG. 6A.
Figure 7A:
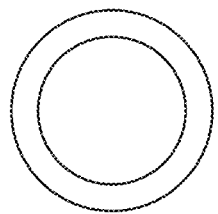
FIG. 7A is a plan view of a retention member of the food product gripping mechanism of FIG. 1.
Figure 7B:
FIG. 7B is a side view of the retention member of FIG. 7A.

Referring now to FIGS. 6A and 6B, each of the wings 74a-74c includes opposing first and second legs 80a-80c, 82a-82c. Each of the first legs 80a-80c includes a clearance aperture 84a-84c, configured to receive a fastener 86 as shown in FIG. 1. Each of the second legs 82a-82c includes threaded apertures 88a-88c configured to from a threaded connection with a threaded portion (not shown) of the fastener 86. As will be discussed in more detail below, the hub 20 serves as a fulcrum for the tongs 24a-24c.

Referring now to FIG. 6B, the openings 78a-78c are centered about the axes C-C, D-D and E-E respectively in a manner such that the plurality of tongs 24a-24c are spaced apart by angles α1, α2 and α3. In the illustrated embodiment, the angles α1, α2 and α3 are equal and are approximately 120 degrees. However, in other embodiment, the angles α1, α2 and α3 need not be equal. While the embodiment shown in FIG. 1 illustrates the use of a quantity of three tongs 24a-24c, it should also be appreciated that in other embodiments, more or less than a quantity of three tongs 24-24c can be used.

Referring again to FIG. 6B, the aperture 76 includes an internal thread configured to receive the external threaded portion 36 of the shaft 12 in a manner such as to form a threaded connection with the shaft 12.

Referring now to FIGS. 1, 2 7A and 7B, the retention member 22 is illustrated. The retention member 22 is configured to retain a portion of the tongs 24a-24c within the channels 70a-70c of the guide spool 18 as the tongs 24a-24c slide within the channels 70a-70c. In the illustrated embodiment, the retention member 22 is an O-ring formed from an elastic polymer material. In alternate embodiments, the retention member 22 can has other forms and can be made from other materials, sufficient to retain a portion of the tongs 24a-24c within the channels 70a-70c of the guide spool 18 as the tongs 24a-24c slide within the channels 70a-70c.

Figure 8:
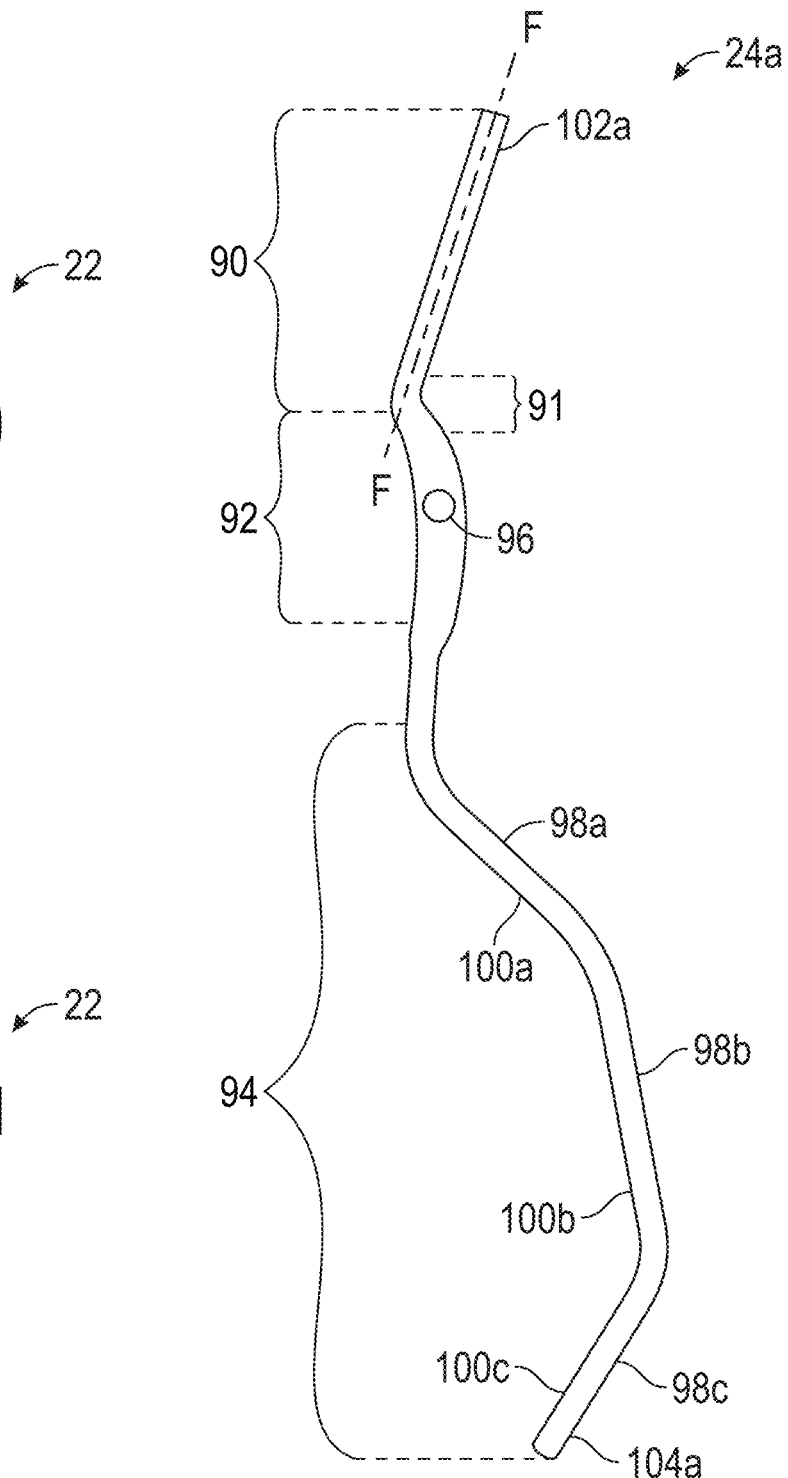
FIG. 8 is a side view of a tong of the food product gripping mechanism of FIG. 1.

Referring now to FIGS. 1, 2 and 8, the tong 24a is illustrated. The tong 24a is representative of the tongs 24b and 24c. The tong 24a includes an upper segment 90, an intermediate segment 92 and a gripping segment 94. The upper segment 90 has the form of a substantially straight member that is aligned with a longitudinal axis F-F. The upper segment 90 is configured for seating in the channel 70a of the guide spool 18 in a manner such that the longitudinal axis F-F of the upper segment 90 is substantially parallel with a longitudinal axis of the channel 70a. As will be explained in more detail below, the upper segment 90 is further configured to slide along the channel 70a of the guide spool in a direction of the longitudinal axis F-F.

Referring again to FIGS. 1, 2, 6B and 8, a recess 91 is formed between the upper segment 90 and the intermediate segment 92. The recess 91 will be discussed in more detail below.

Referring again to FIGS. 1, 2, 6B and 8, the intermediate segment 92 of the tong 24a extends from the upper segment 90 and includes a clearance aperture 96. The intermediate segment 92 is configured for insertion into the opening 78a of the wing 74a of the hub 20 in a manner such that the clearance aperture 96 aligns with the clearance aperture 84a in the first leg 80a and the threaded aperture 88a in the second leg 82a of the wing 74a. The intermediate segment 92 is retained in a position between the first and second legs 80a, 82a of the wing 74a as the fastener 86 is inserted through the clearance aperture 84a in the first leg 80a, through the clearance aperture 96 in the tong 24a and into the threaded aperture 88a in the second leg 82a of the wing 74a. In this position, the tong 24a is configured for rotation about the fastener 24a.

Figure 9:
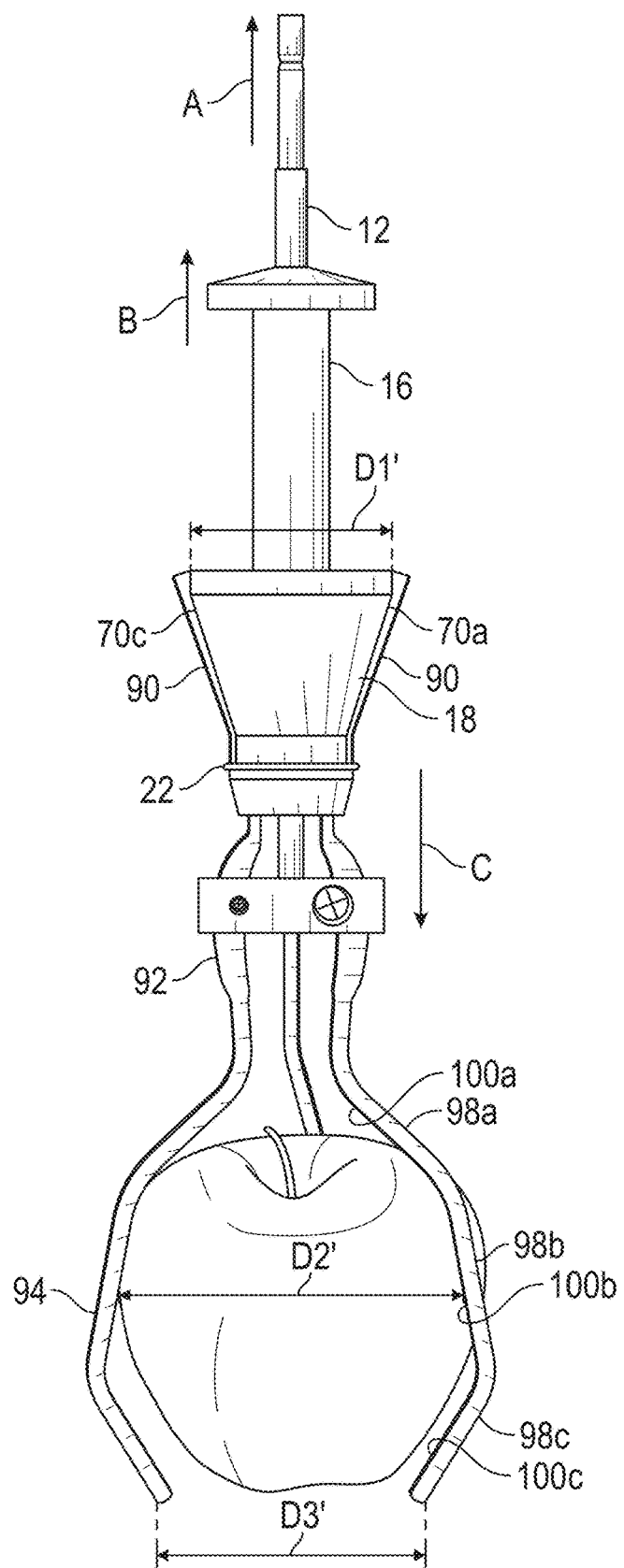
FIG. 9 is a perspective view of the food product gripping mechanism of FIG. 1, shown in an expanded orientation.

Referring again to FIGS. 1, 2 and 8, the gripping segment 94 of the tong 24a extends from the intermediate segment 92 and includes one or more gripping elements 98a-98c. Each of the gripping elements 98a-98c has an inner surface 100a-100c. The plurality of inner surfaces 100a-100c of the gripping elements 98a-98c cooperate to approximate the outer contour of the food product intended to be grabbed and secured during a covering process. Referring now to FIG. 9, the plurality of inner surfaces 100a-100c of the gripping elements 98a-98c cooperate to approximate the outer contour of an apple during a covering process. However, it should be appreciated that the gripping segment 94 can have more or less than a quantity of three gripping elements 98a-98c and the gripping elements 98a-98c can cooperate to form other contours for other food products. It is contemplated that the other food products can include the non-limiting examples of fruits, vegetables, candy, nuts, marshmallows, bread, meat, pasta, cookie dough, popcorn balls and the like.

Referring now to FIGS. 1 and 2, the mechanism 10 is illustrated in a contracted orientation. The term "contracted orientation", as used herein, is defined to mean the mechanism 10 has not gripped and/or secured one or more food products. In the contracted orientation, the tension force of the tension member 14 against the guide spool 18 and against the snap ring 34 urges the shaft 12 to move in an upward, vertical direction, as indicated by direction arrow A. With the second end 30 of the shaft 12 threadably connected to the hub 20, movement of the shaft 12 in the upward, vertical direction A results in movement of the hub 20 in the same upward, vertical direction A. The shaft 12 and the hub 20 continue to move in the upward direction A until the hub 20 contacts and seats against the second end 66 of the guide spool 18. With the hub 20 seated against the second end 66 of the guide spool 18, the upper segments 90 of the tongs 24a are seated in the channels 70a-70c of the guide spool 18 such that the recess 91 is secured by the retention member 22.

Referring again to FIGS. 1, 2 and 8, with the tongs 24a-24c seated in the channels 70a-70c of the guide spool 18 such that the recess 91 is secured by the retention member 22, a first end 102a-102 of the tongs 24a-24c have a first contracted distance D1 therebetween, the gripping elements 98a-98c of the intermediate segments 94 have a second contracted distance D2 therebetween and tips 104a of the gripping segments 98c have a third contracted distance D3 therebetween. In operation, a gripping action will result in changes in the distances D1, D2 and D3.

Figure 10:
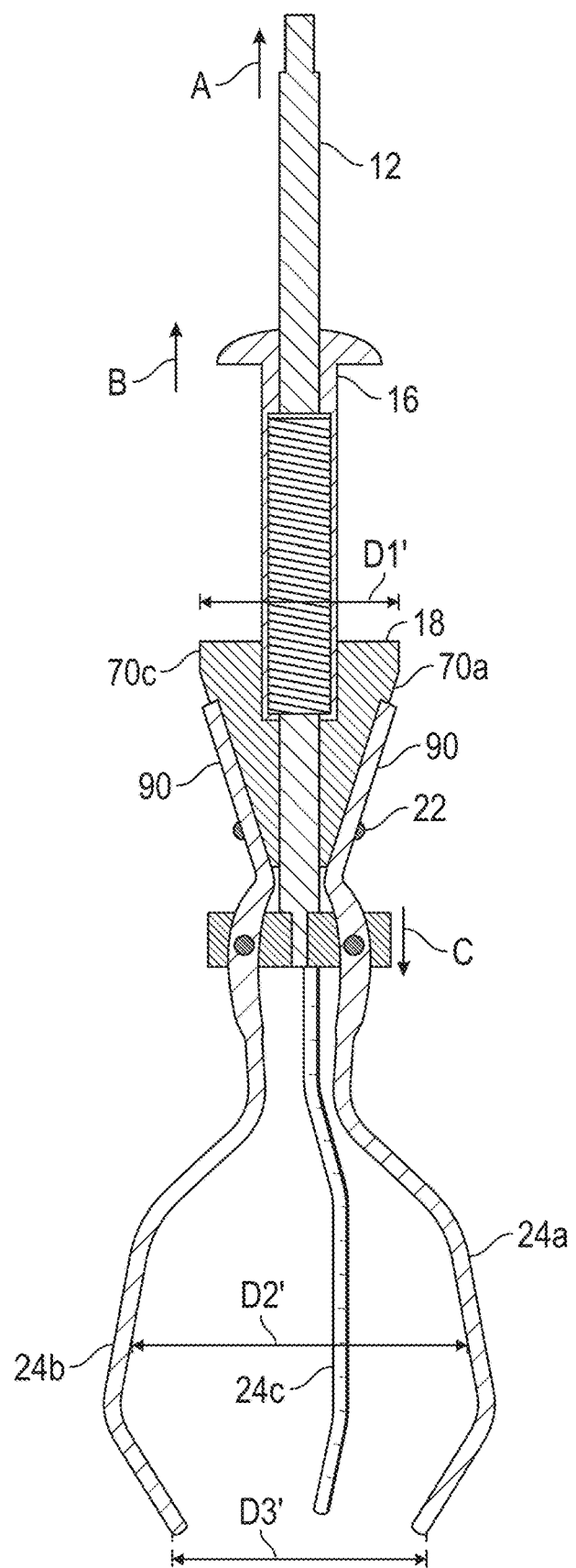
FIG. 10 is a cross-sectional view of the food product gripping mechanism of FIG. 9.

Referring now to FIGS. 9 and 10, the mechanism 10 is illustrated in an expanded orientation. The term "expanded orientation", as used herein, is defined to mean the mechanism 10 has gripped and/or secured one or more food products. In the expanded orientation, the release mechanism 16 is moved in a vertically upward direction, as indicated by direction arrow B, relative to the shaft 12. Movement of the release mechanism 16 in the direction B relative to the shaft 12 compresses the tension member 14 thereby allowing the second end 30 of the shaft 12, threadably connected to the hub 20, to move with the hub 20 in a downward, vertical direction, as indicated by direction arrow C. As the shaft 12 and the hub 20 continue to move in the downward direction C, the upper segments 90 of the tongs 24a-24c slide in a downward direction within the channels 70a-70c of the guide spool 18 while remaining secured to the guide spool 18 by the retention member 22.

Referring again to FIGS. 9 and 10, with the tongs 24a-24c still seated in the channels 70a-70c of the guide spool 18, the hub 20 separates from the guide spool 18. The first end 102a-102 of the tongs 24a-24c have a first expanded distance D1' therebetween, the gripping elements 98a-98c of the intermediate segments 94 have a second expanded distance D2' therebetween and tips 104a of the gripping segments 98c have a third expanded distance D3' therebetween. Since the hub 20 functions as a fulcrum, it should be understood that as the upper segments 90 of the tongs 24a-24c slide in a downward direction within the channels 70a-70c of the guide spool 18, the distance D1', however the distances D2' and D3' increase, thereby allowing the tongs 24a-24c to expand a distance sufficient to position the food product within the intermediate segments 92 of the tongs 24a-24c. As the upward force on the release mechanism 16 is released, the tension force of the tension member 14 against the guide spool 18 and against the snap ring 34 urges the shaft 12 to move in an upward, vertical direction, as indicated by direction arrow A, thereby moving the tongs 24a-24c in a direction toward the contracted orientation. As the tongs 24a-24c contact the food product, the food product is secured within the inner surfaces 100-100c of the plurality of gripping segments 94.

Referring again to FIGS. 9 and 10, the mechanism 10 and the retained food product are now ready for to proceed with the covering process. In certain embodiments, the covering process involves dipping the mechanism 10 and the retained food product in a vessel containing a covering material, such as the non-limiting examples of caramel, chocolate or cheese. However, it is also contemplated that the covering process can include pouring a covering material over the mechanism 10 and the retained food product. After the food product is covered, optionally the food product, still retained within the mechanism can be spun to shed excess covering material. In a next step, the mechanism 10 and the food product can be placed over a receiving structure, such as for example a tray or plate, and the user pulls the release mechanism 18 in a direction away from the tongs 24a-24c to expand the tips 104a-104c of the tongs 24a-24c and release the food product from the tongs 24a-24c. As the covering material settles, no visible sign or markings from the mechanism 10 are present on the covered food product.

While the embodiment of the mechanism 10 shown in FIGS. 1-4 illustrates use of the mechanism 10 in a hand-operated mode, it is contemplated that the mechanism 10 can be easily adapted to a mass production line or assembly line mode.

Summarizing, the mechanism 10 is configured to grab and secure a food product during a covering process without the need to pierce the skin of the food product with a stick or other handle-like structure.

Advantageously, the mechanism 10 facilitates increased food safety and prolongs the shelf life of the food product. In certain instances, the mechanism 10 advantageously also provides increases in the production of the covered food product as production workers can experience less fatigue and can produce less waste.

The principle and mode of operation of the food product gripping mechanism has been described in certain embodiments. However, it should be noted that the food product gripping mechanism may be practiced otherwise than as specifically illustrated and described without departing from its scope.

What is claimed is:

1. A food product gripping mechanism comprising:
   a shaft connected to a hub;
   a release mechanism having a first passage in fluid communication with a second passage, the second passage configured to allow the shaft to pass therethrough;
   a tension member positioned partly within the first passage of the release mechanism;
   a guide spool configured to receive a portion of the tension member and further configured to allow the shaft to pass therethrough, the guide spool having the form of an inverted conical frustum; and
   a plurality of tongs connected to the hub;
   wherein the plurality of tongs are configured for a contracted orientation and further configured for rotation to an expanded orientation and wherein the plurality of tongs are further configured to grip a food product without piercing a skin of the food product and wherein the guide spool includes a plurality of vertically oriented channels spaced apart on an outer surface.

2. The food product gripping mechanism of claim 1, wherein the shaft and the hub are connected together with a threaded connection.

3. The food product gripping mechanism of claim 1, wherein the shaft includes an annular groove configured to receive a snap ring.

4. The food product gripping mechanism of claim 1, wherein an annular groove is located in a center section of the shaft.

5. The food product gripping mechanism of claim 1, wherein the release mechanism includes a head and an opposing threaded second end.

6. The food product gripping mechanism of claim 1, wherein the first passage has a larger diameter than the second passage.

7. The food product gripping mechanism of claim 1, wherein a shoulder is formed at an intersection of the first and second passages and wherein a snap ring seats against the shoulder.

8. The food product gripping mechanism of claim 1, wherein the shaft extends through the tension member.

9. The food product gripping mechanism of claim 1, wherein the tension member is a coil spring.

10. The food product gripping mechanism of claim 1, wherein the plurality of vertically oriented channels are configured to receive portions of the tongs.

11. The food product gripping mechanism of claim 10, wherein the tongs have upper segments configured to slidably move within the channels.

12. The food product gripping mechanism of claim 11, wherein in a contracted orientation, the upper segments have a spaced apart distance than is larger than a spaced apart distance in the expanded orientation.

13. The food product gripping mechanism of claim 1, wherein the hub is configured as a fulcrum for rotation of the plurality of tongs.

14. The food product gripping mechanism of claim 1, wherein the hub includes a plurality of wings, with each of the wings having opposing legs forming an opening to receive the associated tong.

15. A food product gripping mechanism comprising:
   a shaft connected to a hub;

a release mechanism having a first passage in fluid communication with a second passage, the second passage configured to allow the shaft to pass therethrough;

a tension member positioned partly within the first passage of the release mechanism;

a guide spool configured to receive a portion of the tension member and further configured to allow the shaft to pass therethrough, the guide spool having the form of an inverted conical frustum; and a plurality of tongs connected to the hub;

wherein the plurality of tongs are configured for a contracted orientation and further configured for rotation to an expanded orientation and wherein the plurality of tongs are further configured to grip a food product without piercing a skin of the food product and wherein the guide spool includes a first and second bore in fluid communication with each other and configured to allow the shaft to pass therethrough.

16. The food product gripping mechanism of claim 15, wherein the first bore is configured to receive a portion of the tension member and has a larger diameter than the second bore.

17. A food product gripping mechanism comprising:

a shaft connected to a hub;

a release mechanism having a first passage in fluid communication with a second passage, the second passage configured to allow the shaft to pass therethrough;

a tension member positioned partly within the first passage of the release mechanism;

a guide spool configured to receive a portion of the tension member and further configured to allow the shaft to pass therethrough, the guide spool having the form of an inverted conical frustum; and a plurality of tongs connected to the hub;

wherein the plurality of tongs are configured for a contracted orientation and further configured for rotation to an expanded orientation and wherein the plurality of tongs are further configured to grip a food product without piercing a skin of the food product and wherein guide spool includes an annular groove configured to seat a retention member, the retention member configured to retain a portion of the tongs.

18. The food product gripping mechanism of claim 17, wherein the retention member retains the tongs within a plurality of channels as the tongs slidably move within the plurality of channels.

* * * * *